United States Patent
Kanetaka et al.

(10) Patent No.: US 9,250,419 B2
(45) Date of Patent: Feb. 2, 2016

(54) IMAGING LENS AND IMAGE PICKUP APPARATUS PERFORMING FOCUSING OPERATION

(71) Applicant: Sony Corporation, Tokyo (JP)

(72) Inventors: Fumikazu Kanetaka, Chiba (JP); Hisashi Uno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 13/962,089

(22) Filed: Aug. 8, 2013

(65) Prior Publication Data

US 2014/0071332 A1 Mar. 13, 2014

(30) Foreign Application Priority Data

Sep. 11, 2012 (JP) .................................. 2012-199074

(51) Int. Cl.
*G02B 13/00* (2006.01)
*G02B 9/34* (2006.01)
*G02B 13/18* (2006.01)
*H04N 5/232* (2006.01)

(52) U.S. Cl.
CPC .............. *G02B 13/0015* (2013.01); *G02B 9/34* (2013.01); *G02B 13/002* (2013.01); *G02B 13/0045* (2013.01); *G02B 13/18* (2013.01); *H04N 5/23296* (2013.01)

(58) Field of Classification Search
CPC ........... H04N 5/23212; H04N 5/23296; G03B 21/28; G02B 9/34; G02B 13/0015
See application file for complete search history.

(56) References Cited

U.S. PATENT DOCUMENTS

| 6,718,132 | B2* | 4/2004 | Nishina | G02B 15/173 348/240.3 |
| 8,630,045 | B2* | 1/2014 | Kawamura | G02B 15/173 359/680 |
| 2011/0194015 | A1* | 8/2011 | Kanetaka | G02B 15/173 348/345 |
| 2011/0304923 | A1* | 12/2011 | Kawamura | 359/687 |

FOREIGN PATENT DOCUMENTS

| JP | 2011-064919 A | 3/2011 |
| JP | 2012-123340 A | 6/2012 |

* cited by examiner

*Primary Examiner* — Ahmed A Berhan
(74) *Attorney, Agent, or Firm* — Hazuki International, LLC

(57) ABSTRACT

An imaging lens includes: a movable lens group with total positive refractive power, including first and second sub lens groups; and an ever-fixed lens group that is ever-fixed. The imaging lens has first and second focusing modes for focusing operation in first and second focus ranges, respectively. The first focus range covers from an object at an infinite distance to an object at a first finite distance, and the second focus range covers from an object at a second finite distance shorter than the infinite distance to an object at a third finite distance shorter than the first finite distance. The first sub lens group is configured to be fixed and the second sub lens group is configured to travel, during each of the first and second focusing modes. Traveling of the movable lens group toward object plane allows switching from the first to second focusing modes.

11 Claims, 10 Drawing Sheets

IMAGING LENS AND IMAGE PICKUP APPARATUS PERFORMING FOCUSING OPERATION

BACKGROUND

The present disclosure relates to an imaging lens that has a focusing function and is suitably used in an electronic camera such as a digital video camcorder and a digital still camera. The present disclosure also relates to an image pickup apparatus that uses such an imaging lens.

Recently, a digital video camcorder, a digital still camera, etc. that use a solid-state image pickup device such as a CCD (Charge Coupled Device) and a CMOS (Complementary Metal-Oxide Semiconductor) have been rapidly in wide spread use. With the spread of such digital cameras etc., a demand has been increased for a high-performance imaging lens that has superior portability and is suitable for high pixel density. Moreover, recent needs are various, which can be seen from some users requiring not only a zoom lens but also a single-focus lens that has a fixed focal length.

As a need for the single-focus lens, the single-focus lens is expected to have a large aperture ratio having an open F number of about F2, compact size, and high performance. Moreover, the single-focus lens is expected to be capable of shooting an object at an infinite distance to an object in proximity. As such an imaging lens, for example, lenses disclosed in Japanese Unexamined Patent Application Publication Nos. 2011-64919 (JP2011-64919A) and 2012-123340 (JP2012-123340A) are known. The imaging lens disclosed in JP2011-64919A has a floating mechanism that allows two lenses to travel during focusing operation, and has a half angle of view of about 25 degrees, an open F number of around 2.8, and maximum magnification of about ½. The imaging lens disclosed in JP2012-123340A has two shooting modes between which a distance of an object that is allowed to be shot is different, and has a half angle of view of about 25 degrees, an open F number of around 2.8, and maximum magnification of about ¼.

SUMMARY

The imaging lenses disclosed in JP2011-64919A and JP2012-123340A are capable of shooting an object in proximity with magnification from about ½ to about ¼, but are insufficient in terms of size reduction and increase in aperture ratio. For example, performance of the imaging lenses disclosed in JP2011-64919A and JP2012-123340A is insufficient to be a lens that achieves size reduction, has a large aperture ratio having an open F number of around 2.0, and performs shooting of an object in proximity with the magnitude up to about ¼.

It is desirable to provide an imaging lens and an image pickup apparatus that achieve size reduction and allow shooting of an object in proximity in a simple configuration while having large aperture ratio and favorable optical performance.

According to an embodiment of the present disclosure, there is provided an imaging lens including: a movable lens group with total positive refractive power, including a first sub lens group and a second sub lens group; and an ever-fixed lens group that is ever-fixed. The imaging lens has a first focusing mode for focusing operation in a first focus range and a second focusing mode for focusing operation in a second focus range. The first focus range covers from an object at an infinite distance to an object at a first finite distance, and the second focus range covers from an object at a second finite distance that is shorter than the infinite distance to an object at a third finite distance that is shorter than the first finite distance. The first sub lens group is configured to be fixed during each of the first and second focusing modes. The second sub lens group is configured to travel during each of the first and second focusing modes. Traveling of the movable lens group as a whole toward object plane allows switching from the first focusing mode to the second focusing mode.

According to an embodiment of the present disclosure, there is provided an image pickup apparatus with an imaging lens and an image pickup device outputting an image pickup signal based on an optical image formed by the imaging lens. The imaging lens includes: a movable lens group with total positive refractive power, including a first sub lens group and a second sub lens group; and an ever-fixed lens group that is ever-fixed. The imaging lens has a first focusing mode for focusing operation in a first focus range and a second focusing mode for focusing operation in a second focus range. The first focus range covers from an object at an infinite distance to an object at a first finite distance, and the second focus range covers from an object at a second finite distance that is shorter than the infinite distance to an object at a third finite distance that is shorter than the first finite distance. The first sub lens group is configured to be fixed during each of the first and second focusing modes. The second sub lens group is configured to travel during each of the first and second focusing modes. Traveling of the movable lens group as a whole toward object plane allows switching from the first focusing mode to the second focusing mode.

In the imaging lens and the image pickup apparatus according to the above embodiments of the present disclosure, the switching of the focusing state from the first focusing mode for the focusing operation in the first focus range to the second focusing mode for the focusing operation in the second focus range is performed through the traveling of the movable lens group as a whole toward the object plane. The movable lens group includes the first sub lens group and the second sub lens group, and focusing operation is performed with the use of the second sub lens group during the focusing operation in each of the first and second focus ranges.

According to the imaging lens and the image pickup apparatus of the above embodiments of the present disclosure, two focusing modes are provided depending on a distance to an object, and the switching between the two focusing modes are performed through the traveling of the movable lens group as a whole. Also, a lens configuration of each of the movable lens group and the ever-fixed lens group is optimized. Therefore, size reduction is achieved and shooting of an object in proximity is allowed in a simple configuration while achieving large aperture ratio and favorable optical performance.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
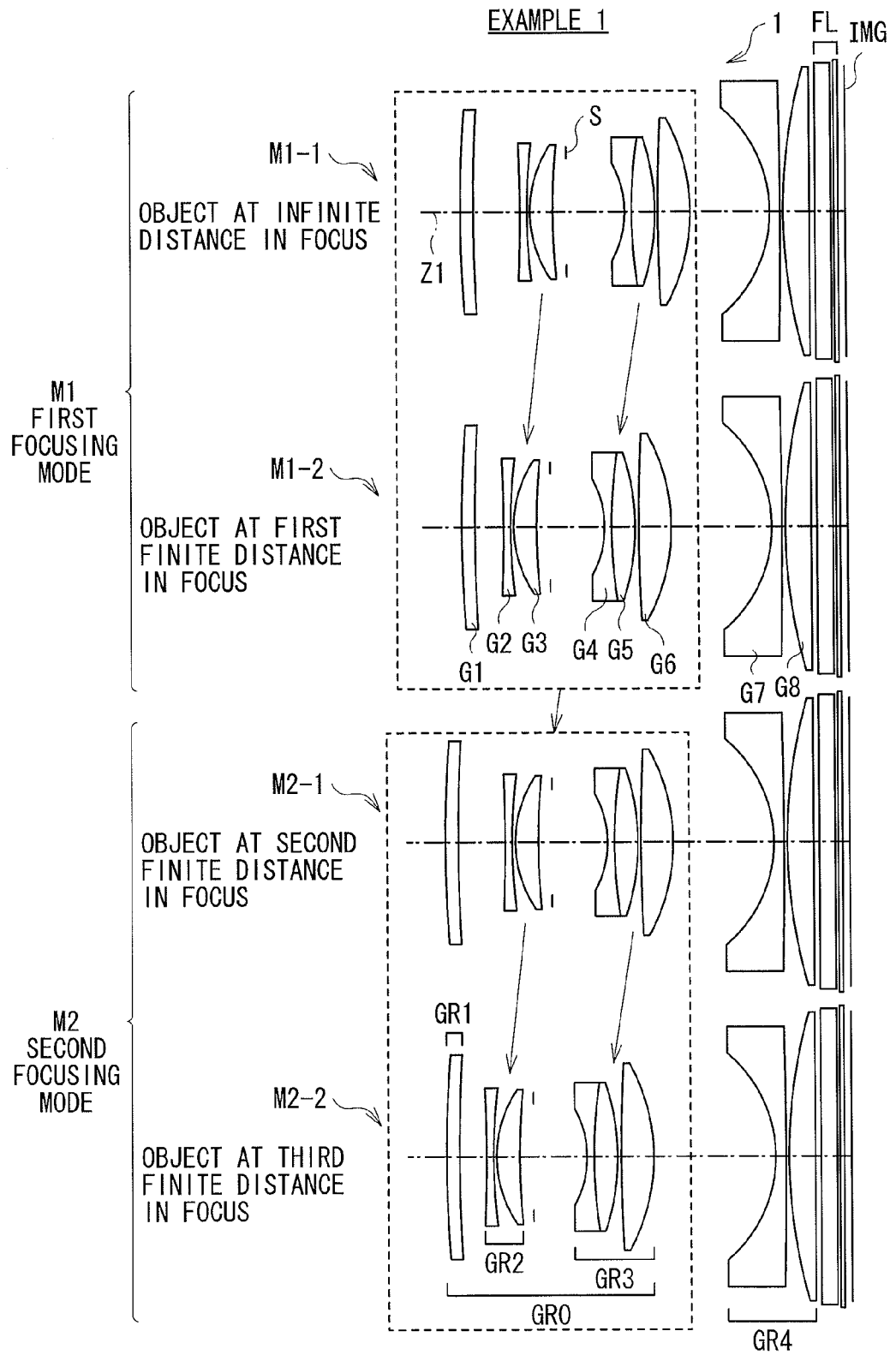
FIG. 1 is a lens cross-sectional view illustrating a first configuration example of an imaging lens according to an embodiment of the present disclosure, together with a traveling state of respective lens groups during focusing operation.
Figure 6:
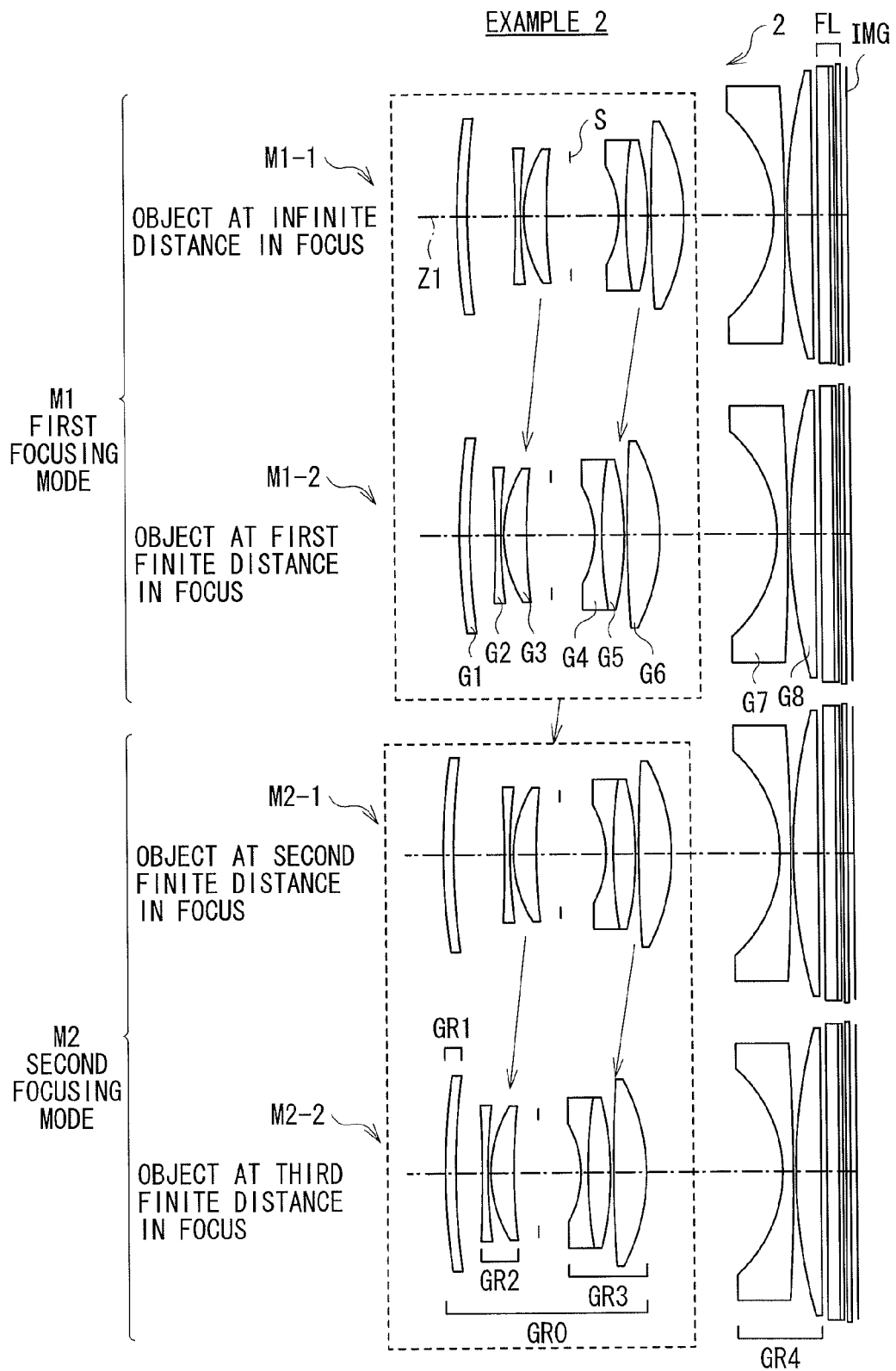
FIG. 6 is a lens cross-sectional view illustrating a second configuration example of the imaging lens, together with a traveling state of respective lens groups during focusing operation.
Figure 11:
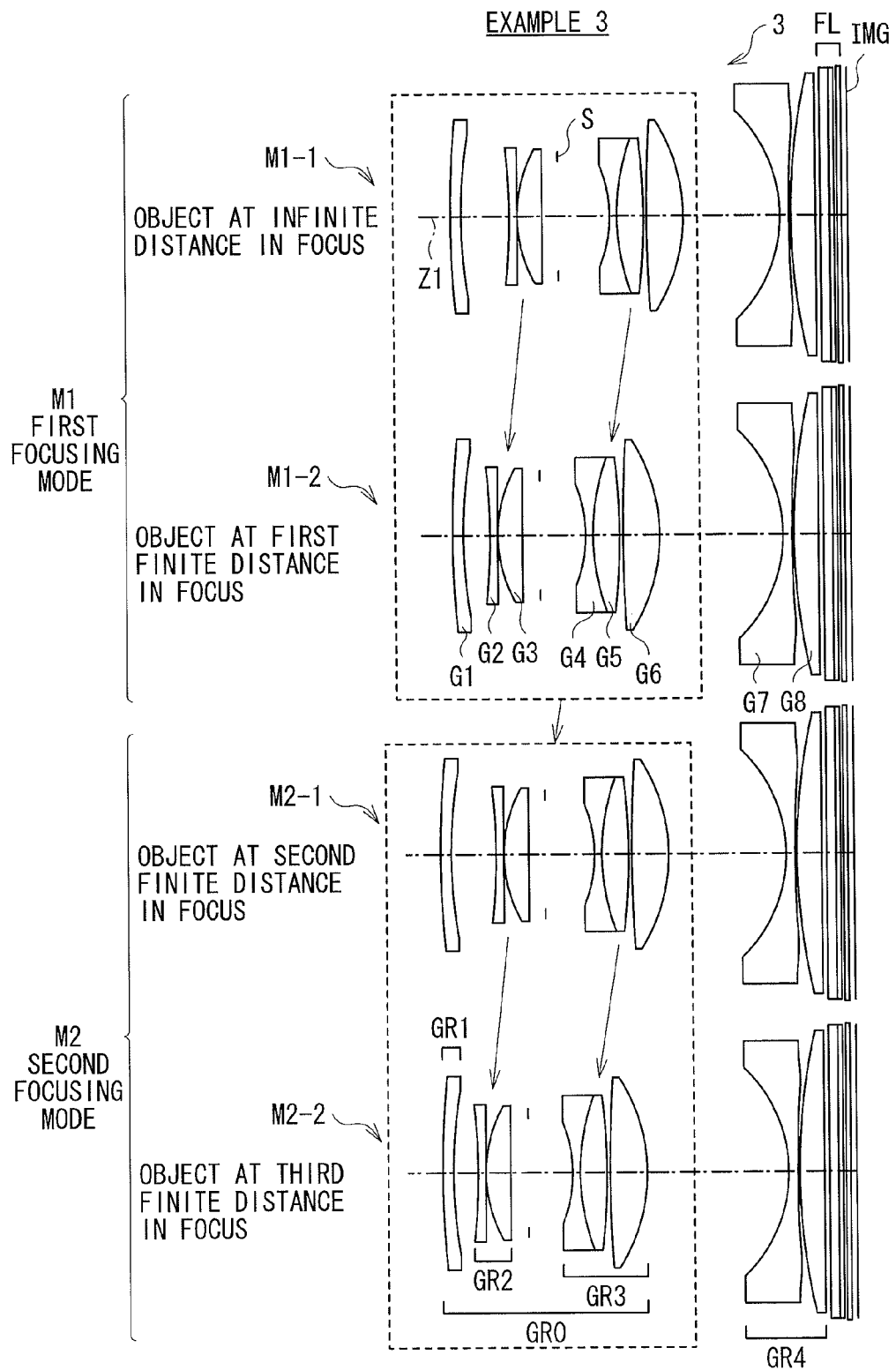
FIG. 11 is a lens cross-sectional view illustrating a third configuration example of the imaging lens, together with a traveling state of respective lens groups during focusing operation.

An embodiment of the present disclosure will be described below in detail referring to the drawings. The description will be given in the following order.
1. Basic Configuration of Lens
2. Functions and Effects
3. Example of Application to Image Pickup Apparatus
4. Numerical Examples of Lens
5. Other Embodiments 1. Basic Configuration of Lens FIG. 1 illustrates a first configuration example of an imaging lens according to an embodiment of the present disclosure. The configuration example corresponds to a lens configuration in Numerical Example 1 which will be described later. Similarly, second and third configuration examples that correspond to lens configurations in Numerical Examples 2 and 3 which will be described later are shown in FIGS. 6 and 11, respectively. In FIG. 1 etc., a symbol "IMG" indicates image plane and "Z1" indicates an optical axis. A configuration of the imaging lens according to the present embodiment will be described below in correspondence with the configuration examples shown in FIG. 1 etc., where appropriate. However, the technology of the embodiment of the present disclosure is not limited to the configuration examples shown in the drawings.

The imaging lens according to the present embodiment has two focusing modes depending on a distance to the object. A first focusing mode M1 allows focusing operation in a first focus range to be performed. A second focusing mode M2 allows focusing operation in a second focus range to be performed. The first focus range covers from an object at an infinite distance to an object at a first finite distance. The second focus range covers from an object at a second finite distance that is shorter than the infinite distance to an object at a third finite distance that is shorter than the first finite distance.

FIG. 1 etc. show, from the upper side thereof, a lens position M1-1 in a state that an object at the infinite distance is in focus and a lens position M1-2 in a state that an object at the first finite distance is in focus, as well as a lens position M2-1 in a state that an object at the second finite distance is in focus and a lens position M2-2 in a state that an object at the third finite distance is in focus, together with traveling paths of lens groups that travel during focusing operation. A solid-line arrow indicates that a lens group travels during focusing operation in each focusing mode and during switching between the two focusing modes. The traveling lens group is present at a position indicated by the arrow in accordance with variation in shooting distance.

The imaging lens according to the present embodiment includes a movable lens group GR0 with total positive refractive power, and an ever-fixed lens group (a fourth lens group GR4). The movable lens group GR0 includes a first sub lens group (a first lens group GR1) that is configured to be fixed during focusing operation in each of the first and second focus ranges, and a second sub lens group (a second lens group GR2 and a third lens group GR3) for performing the focusing operation in each of the first and second focus ranges.

Switching of a focusing state from the first focusing mode M1 to the second focusing mode M2 is performed through traveling of the movable lens group GR0 as a whole toward object plane.

Moreover, the imaging lens according to the present embodiment may desirably satisfy predetermined conditional expressions and the like that will be described later.

2. Functions and Effects

Next, description will be given of functions and effects of the imaging lens according to the present embodiment. Configuration that may be desirable will be described together therewith.

Generally, it is known that focusing operation from an object at an infinite distance to an object in proximity is performed through allowing a lens group having positive (negative) refractive power to travel toward the object plane (image plane). In order to allow an object in a shorter distance to be in focus, it is necessary to increase a travel amount of the lens group. Therefore, it has been difficult to achieve reduction in size of the optical system and to secure favorable optical performance independently of shooting distance. Also, a close-up lens may be attached in order to achieve shooting of an object in proximity, which, however, has disadvantages such as troublesome attachment and detachment of the close-up lens and degradation in peripheral performance.

On the other hand, in the present embodiment, as described above, shooting of an object in proximity is achieved only by allowing part (movable lens group GR0) of the optical system to travel forward, and the total optical length is reduced in the first focusing mode M1 that allows shooting of an object at the infinite distance which is frequently performed. In the second focusing mode M2 that allows shooting of an object in proximity, the amount of movement of the lens as a whole and a position of the second sub lens group (the second lens group GR2 and the third lens group GR3) in the movable lens group GR0 are set appropriately, and thereby, favorable optical performance is obtained. Accordingly, by configuring the imaging lens in the above-described manner, size reduction is achieved and shooting of an object in proximity is allowed in a simple configuration while achieving large aperture ratio and favorable optical performance.

In the imaging lens according to the present embodiment, the ever-fixed lens group may be desirably arranged at a most-image-sided position. A lens group arranged at the most-image-sided position is likely to be large in order to allow a sufficient amount of light to reach an image pickup device. In order to allow the large lens group to travel, it is necessary to arrange, around the large lens group, a mechanism that allows the large lens group to travel. Therefore, an increase in size of lens barrel structure is inevitable. In contrast, in the present embodiment, the lens group that is arranged at the most-image-sided position may be ever-fixed. Accordingly, simplification in lens barrel configuration and size reduction are achieved. It is to be noted that the fourth lens group GR4 is the ever-fixed lens group in the configuration example shown in FIG. 1 etc.

The lens group that is arranged at the most-image-sided position may desirably have negative refractive power. By allowing the rearmost lens group to have negative refractive power, a telephoto-type configuration is achieved. Therefore, the size of the lens system that tends to be large when large aperture ratio is achieved is reduced.

The focusing operation in the first focusing mode M1 and the focusing operation in the second focusing mode M2 may be desirably performed through traveling of the same lens group along the optical axis. By adopting such a configuration, an actuator for driving the focusing lens is allowed to be shared in the first focusing mode M1 and the second focusing mode M2. Therefore, simplification in lens barrel configuration and size reduction are achieved. It is to be noted that, in the configuration example shown in FIG. 1 etc., the second lens group GR2 and the third lens group GR3 are configured to travel along the optical axis as the second sub lens group in both the first focusing mode M1 and the second focusing mode M2. However, lens group configured to travel as the second sub lens group in the first focusing mode M1 may be different from that in the second focusing mode M2.

The lens group that is movable during focusing operation may desirably have an aspherical surface. Aberration caused by the movement of the lens upon focusing may be corrected by the aspherical surface, and thereby, aberration is favorably corrected independently of shooting distance.

The focusing operation in the first focusing mode M1 and the second focusing mode M2 may be desirably performed through traveling of two lens groups toward the object plane independently of each other. In particular, in a lens having large aperture ratio, variation in aberration is large upon focusing. Therefore, by adjusting a positional relationship between the two lens groups, the aberration is corrected, and higher performance is achieved.

A traveling path of the second sub lens group during focusing operation may be desirably different between in the first focusing mode M1 and in the second focusing mode M2. Specifically, when the second sub lens group is configured of two lens groups, the traveling difference between one of the two lens groups and the other thereof may be desirably different between during the focusing operation in the first focusing mode M1 and during the focusing operation in the second focusing mode M2. In particular, in a lens having large aperture ratio, variation in aberration is large upon focusing. Therefore, by optimizing the positional relationship of the two lens groups for each focusing mode, the aberration is corrected, and the aberration is favorably corrected in both the first focusing mode M1 and the second focusing mode M2.

[Description of Conditional Expressions]

In the imaging lens according to the present embodiment, further favorable performance is obtained by so optimizing the configuration of each lens as to satisfy at least one, and preferably, two or more in combination, of the following conditional expressions.

The imaging lens according to the present embodiment may desirably satisfy the following Conditional Expression (1).

$$0.6 < T1/T2 < 1.5 \tag{1}$$

In the above-described Conditional Expression (1), T1 is a length of the movable lens group GR0 along the optical axis in a state that an object at the infinite distance is in focus in the first focusing mode M1, and T2 is the length of the movable lens group GR0 along the optical axis in a state that an object at the second finite distance is in focus in the second focusing mode M2.

By allowing the imaging lens to satisfy Conditional Expression (1), the size of the lens system is reduced. Conditional Expression (1) defines a ratio between the length of the movable lens group GR0 along the optical axis in the state that an object at the infinite distance is in focus in the first focusing mode M1 and the length of the movable lens group GR0 along the optical axis in the state that an object at the second finite distance is in focus in the second focusing mode M2. By allowing the imaging lens to satisfy Conditional Expression (1), the travel amount of the lens group that is movable during focusing operation in the movable lens group GR0 becomes substantially equivalent between in the first focusing mode M1 and in the second focusing mode M2.

Therefore, a space necessary for focusing operation is utilized effectively. This is advantageous in reducing the size of the optical system and this also allows favorable correction of aberration in both the first focusing mode M1 and the second focusing mode M2. It is to be noted that, concerning Conditional Expression (1), a lower limit may be preferably set to 0.9 and an upper limit may be preferably set to 1.1 as shown in the following Conditional Expression (1)'.

$$0.9<T1/T2<1.1 \qquad (1)'$$

The imaging lens according to the present embodiment may desirably satisfy the following Conditional Expression (2).

$$2.0<TL/Y<3.5 \qquad (2)$$

In the above-described Conditional Expression (2), TL is a total length of the imaging lens in a state that an object at the infinite distance is in focus, and Y is a maximum image height along the image plane.

By allowing the imaging lens to satisfy Conditional Expression (2), reduction is achieved in the size of the lens barrel during focusing operation in a state that an object at the infinite distance is in focus that is frequently performed. Conditional Expression (2) defines the total length of the imaging lens in the state that an object at the infinite distance is in focus. If a value of TL/Y is smaller than the lower limit in Conditional Expression (2), it is necessary to increase refractive power of each lens more than necessary to reduce the total length of the lens system. Therefore, degradation in optical performance caused by manufacturing errors is increased. In contrast, if the value of TL/Y is larger than the upper limit in Conditional Expression (2), the total optical length is long. Therefore, size reduction during focusing operation is prevented. Accordingly, by allowing the imaging lens to satisfy Conditional Expression (2), size reduction during focusing operation is achieved. It is to be noted that, concerning Conditional Expression (2), the lower limit may be more preferably set tp 2.3 and the upper limit may be more preferably set to 3.2 as shown in the following Conditional Expression (2)'.

$$2.3<TL/Y<3.2 \qquad (2)'$$

As described above, according to the present embodiment, two focusing modes depending on the distance to an object are provided, the switching between the two focusing modes is performed through traveling of the movable lens group GR0 as a whole, and the lens configurations of the movable lens group GR0 and the ever-fixed lens group are optimized. Therefore, size reduction is achieved and shooting of an object in proximity is allowed in a simple configuration while achieving high aperture ratio and favorable optical performance.

3. Example of Application to Image Pickup Apparatus

Figure 16:
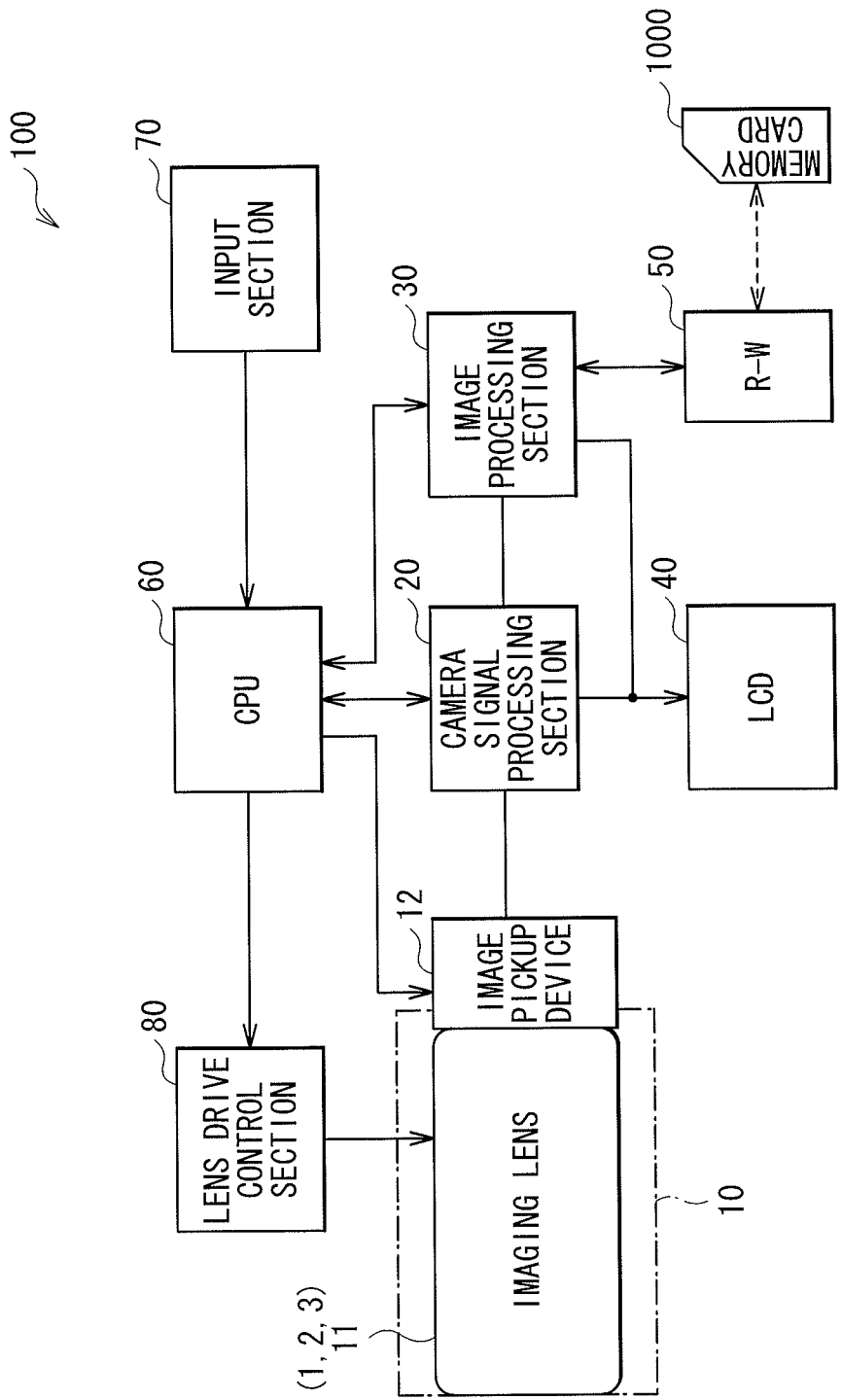
FIG. 16 is a block diagram illustrating a configuration example of an image pickup apparatus.

FIG. 16 illustrates a configuration example of an image pickup apparatus 100 to which the imaging lens according to the present embodiment is applied. The image pickup apparatus 100 may be, for example, a digital still camera, and may include a camera block 10, a camera signal processing section 20, an image processing section 30, an LCD (Liquid Crystal Display) 40, an R-W (reader-writer) 50, a CPU (Central Processing Unit) 60, an input section 70, and a lens drive control section 80.

The camera block 10 has an image pickup function, and includes an optical system that includes an imaging lens 11 (any of imaging lenses 1 to 3) as an image pickup lens, and an image pickup device 12 such as a CCD (Charge Coupled Device) and a CMOS (Complementary Metal Oxide Semiconductor). The image pickup device 12 converts an optical image formed by the imaging lens 11 into an electric signal, and thereby, outputs the image pickup signal (image signal) based on the optical image.

The camera signal processing section 20 performs, on the image signal supplied from the image pick up device 12, various kinds of signal processing such as analog-digital conversion, denoising, image quality correction, and conversion to luminance-color-difference signal.

The image processing section 30 performs recording and reproducing processing on the image signal. Specifically, the image processing section 30 may perform, for example, compression coding and expansion decoding processing on the image signal based on a predetermined image data format, conversion processing on data specification such as resolution etc.

The LCD 40 has a function of displaying various data such as an operation state of a user with respect to the input section 70 and an shot image. The R-W 50 writes the image data coded by the image processing section 30 into a memory card 1000 and reads the image data recorded in the memory card 1000. The memory card 1000 may be, for example, a semiconductor memory that is attachable to and detachable from a slot connected to the R-W 50.

The CPU 60 serves as a control processing section that controls each circuit block provided in the image pickup apparatus 100. The CPU 60 controls each circuit block based on, for example, instruction input signal from the input section 70 etc. The input section 70 may be configured, for example, of various switches with which necessary operation is performed by the user and the like. The input section 70 may be configured, for example, of a shutter release button for performing shutter operation, a selection switch for selecting operation modes etc. and outputs, to the CPU 60, the instruction input signal according to the user's operation. The lens drive control section 80 controls drive of the lens arranged in the camera block 10, and controls components such as an unillustrated motor that drives each lens in the imaging lens 11 based on the control signal from the CPU 60.

Description will be given below of operation in the image pickup apparatus 100. In a standby state for shooting, under control of the CPU 60, the image signal shot in the camera block 10 is outputted to the LCD 40 through the camera signal processing section 20 and is displayed as a camera-through image. Further, for example, when the instruction input signal for focusing is inputted from the input section 70 to the CPU 60, the CPU 60 outputs the control signal to the lens drive control section 80 and a predetermined lens in the imaging lens 11 travels based on the control of the lens drive control section 80.

When an unillustrated shutter in the camera block 10 operates according to the instruction input signal from the input section 70, the shot image signal is outputted from the camera signal processing section 20 to the image processing section 30, the outputted signal is compression coded, and the coded signal is converted into digital data having a predetermined data format. The converted data is outputted to the R-W 50 and the outputted data is written into the memory card 1000.

It is to be noted that, for example, when the shutter release button in the input section 70 is pressed half way, when the shutter release button is pressed all the way for recording (shooting) etc., the lens drive control section 80 allows the predetermined lens in the imaging lens 11 to travel based on the control signal from the CPU 60, and thereby, the focusing operation is performed.

Upon reproducing the image data recorded in the memory card 1000, the R-W 50 reads a predetermined image data from the memory card 1000 according to the operation with respect to the input section 70, and the image processing section 30 performs the extension decoding processing on the predetermined image data. Thereafter, a reproduction image signal is outputted to the LCD 40 and the reproduced image is displayed thereon.

It is to be noted that, in the above-described embodiment, an example in which the image pickup apparatus is applied to the digital still camera is described. However, a range of application of the image pickup apparatus is not limited to a digital still camera, and specific applications of the image pickup apparatus 100 may include various other electronic apparatuses. For example, various other electronic apparatuses such as a lens interchangeable camera, a digital video camera, a mobile phone in which a digital video camera or the like is assembled, and a PDA (Personal Digital Assistant) may be the specific applications of the image pickup apparatus 100 without limitation.

EXAMPLES

4. Numerical Examples of Lens

Next, description will be given of specific numerical examples of the imaging lens according to the present embodiment. Symbols etc. in the tables and the description below represent the following. "Surface number" represents the number of an i-th surface where a surface of a most-object-sided component is counted as a 1st surface and numerals are sequentially attached to surfaces of the components so that the numeral becomes larger as the surface of the component become closer to the image plane. "ri" represents a value (mm) of a paraxial curvature radius of the i-th surface. "Di" represents a value (mm) of a spacing on the optical axis between the i-th surface and the (i+1)th surface. "Ni" represents a value of a refractive index of the d line (with wavelength of 587.6 nm) of a material of an optical component that has the i-th surface. "vi" represents a value of an Abbe number of the d line of the material of the optical component that has the i-th surface. The value "0" in "curvature radius" indicates a planar surface or an aperture stop surface.

Some lenses used in the respective numerical examples have a lens surface that is aspherical. A shape of the aspherical surface is defined by the following expression for the aspherical surface, where "x" is a distance (sag amount) from the vertex of the lens surface along the optical axis, "y" is a height (image height) in a direction perpendicular to the optical axis, "c" is a paraxial curvature (reciprocal of curvature radius) at the vertex of the lens, "K" is a conic constant, and "A", "B", "C", and "D" are aspherical surface coefficients of 4th order, 6th order, 8th order, and 10th order, respectively. In respective tables showing the aspherical surface coefficients which will be described later, "E-i" is an exponential expression having 10 as a base. In other words, "E-i" represents "$10^{-i}$". To give an example, "0.12345E-05" represents "$0.12345 \times 10^{-5}$".
(Expression for Aspherical Surface)

$$x = cy^2/(1+(1-(1+K)c^2y^2)^{1/2}) + Ay^4 + By^6 + \ldots$$

[Configuration Common to Respective Numerical Examples]

Any of the imaging lenses 1 to 3 below corresponding to the respective numerical examples has a configuration that satisfies the configuration described above in [1. Basic Configuration of Lenses]. Further, any of the imaging lenses 1 to 3 corresponding to the respective numerical examples includes a first lens group GR1 having positive or negative refractive power, a second lens group GR2 having positive refractive power, a third lens group GR3 having positive refractive power, and a fourth lens group GR4 having negative refractive power that are arranged in order from the object plane toward the image plane.

Numerical Example 1

Tables 1 to 4 each show specific numerical examples corresponding to the imaging lens 1 according to the first configuration example shown in FIG. 1. In particular, Table 1 shows basic lens data thereof, and Table 2 shows data on aspherical surfaces. Tables 3 and 4 show other data.

In the imaging lens 1, the first lens group GR1 includes a first lens G1 that is configured of a meniscus-shaped positive lens that has a convex surface facing toward the object plane. The second lens group GR2 includes a second lens G2 and a third lens G3 that are arranged in order from the object plane toward the image plane. The second lens G2 is configured of a negative lens having a biconcave shape. The third lens G3 is a meniscus-shaped positive lens that has a convex surface facing toward the object plane. The third lens group GR3 includes a cemented lens in which a fourth lens G4 and a fifth lens G5 are cemented to each other and a sixth lens G6 that are arranged in order from the object plane toward the image plane. The fourth lens G4 is configured of a negative lens having a biconcave shape. The fifth lens G5 is configured of a positive lens having a biconvex shape. The sixth lens G6 is configured of a positive lens having a biconvex shape. The fourth lens group GR4 includes a seventh lens G7 and an eighth lens G8 that are arranged in order from the object plane toward the image plane. The seventh lens G7 is configured of a negative lens having a biconcave shape. The eighth lens G8 is configured of a positive lens having a plano-convex shape that has a convex surface facing toward the object plane. A filter FL is arranged between the fourth lens group GR4 and the image plane IMG. An aperture stop S is arranged in vicinity of the second lens group GR2 on the image plane side thereof, and travels together with the second lens group GR2 during focusing operation. During focusing operation, the second lens group GR2 and the third lens group GR3 in the movable lens group GR0 serve as the second sub lens group.

In Numerical Example 1, both surfaces (a fifth surface and a sixth surface) of the positive lens (G3) in the second lens group GR2, an image-sided surface (a tenth surface) of the positive lens (G5) in the third lens group GR3, and both surfaces (a thirteenth surface and a fourteenth surface) of the negative lens (G7) in the fourth lens group GR4 are aspherical surfaces. Values of the 4th-order, 6th-order, 8th-order, and 10th-order aspherical surface coefficients A, B, C, and D of the aspherical surfaces in Numerical Example 1 are shown together with values of the conic constant K in Table 2.

Table 3 shows values of a focal length f, F number Fno, and a half angle of view ω in a state that an object at the infinite distance is in focus in the first focusing mode M1, in a state that an object at the first finite distance is in focus in the first focusing mode M1, in a state that an object at the second finite distance is in focus in the second focusing mode M2, and in a state that an object at the third finite distance is in focus in the second focusing mode M2.

In Numerical Example 1, during focusing operation, a surface spacing D2 between the first lens group GR1 and the second lens group GR2, a surface spacing D7 between the second lens group GR2 and the third lens group GR3, and a surface spacing D12 between the third lens group GR3 and the fourth lens group GR4 are varied. Table 4 shows values of magnification and variable spacing in each of the state that an object at the infinite distance is in focus in the first focusing mode M1, the state that an object at the first finite distance is in focus in the first focusing mode M1, the state that an object at the second finite distance is in focus in the second focusing mode M2, and the state that an object at the third finite distance is in focus in the second focusing mode M2.

TABLE 1

Example 1

| lens group | surface number | ri | Di | Ni | vi |
|---|---|---|---|---|---|
| GR1 | 1 | 148.275 | 2.00 | 1.5831 | 59.46 |
|  | 2 | 176.755 | (D2) |  |  |
| GR2 | 3 | −226.036 | 1.00 | 1.8467 | 23.78 |
|  | 4 | 64.854 | 0.50 |  |  |
|  | 5 | 19.228 | 3.64 | 1.8820 | 37.22 |
|  | 6 | 281.788 | 2.00 |  |  |
| (aperture stop) | 7 | 0.000 | (D7) |  |  |
| GR3 | 8 | −16.059 | 1.00 | 1.9229 | 20.88 |
|  | 9 | 70.230 | 3.65 | 1.8820 | 37.22 |
|  | 10 | −28.810 | 0.50 |  |  |
|  | 11 | 199.254 | 4.78 | 2.0010 | 29.13 |
|  | 12 | −30.755 | (D12) |  |  |
| GR4 | 13 | −15.660 | 1.50 | 1.5831 | 59.46 |
|  | 14 | 1804.653 | 0.50 |  |  |
|  | 15 | 79.652 | 3.94 | 1.8810 | 40.14 |
|  | 16 | 0.000 | 1.00 |  |  |
| FL | 17 | 0.000 | 2.44 | 1.5168 | 64.20 |
|  | 18 | 0.000 | 0.42 |  |  |
|  | 19 | 0.000 | 0.70 | 1.5168 | 64.20 |
|  | 20 | 0.000 | 0.92 |  |  |

TABLE 2

Example 1 • aspherical surface data

| surface number | K | A | B | C | D |
|---|---|---|---|---|---|
| 5 | 4.3353E−01 | −3.1656E−06 | 3.1162E−08 | 1.0250E−11 | 1.2104E−12 |
| 6 | −4.2666E+01 | 1.5085E−05 | 2.9962E−08 | 1.6434E−10 | −6.3221E−13 |
| 10 | −5.8837E+00 | −1.1103E−05 | 1.4391E−07 | 1.8414E−11 | 1.4251E−12 |
| 13 | −1.2517E+00 | 9.7938E−06 | −5.1076E−08 | −1.9775E−10 | 1.0206E−12 |
| 14 | 4.8867E+01 | 1.2554E−05 | −6.1244E−08 | 1.2588E−11 | 1.1295E−13 |

TABLE 3

Example 1

|  | first focusing mode | | second focusing mode | |
|---|---|---|---|---|
|  | infinite distance | first finite distance | second finite distance | third finite distance |
| f | 35.82 | 32.44 | 32.51 | 29.57 |
| Fno | 2.05 | 2.17 | 2.17 | 2.32 |
| ω | 31.13 | 29.78 | 29.75 | 28.15 |

TABLE 4

Example 1

|  | first focusing mode | | second focusing mode | |
|---|---|---|---|---|
|  | infinite distance | first finite distance | second finite distance | third finite distance |
| magnification | — | 0.13 | 0.12 | 0.27 |
| D2 | 7.29 | 4.55 | 7.25 | 4.12 |
| D7 | 8.86 | 8.37 | 8.36 | 8.15 |
| D12 | 12.38 | 15.62 | 15.61 | 18.95 |

Figure 2:
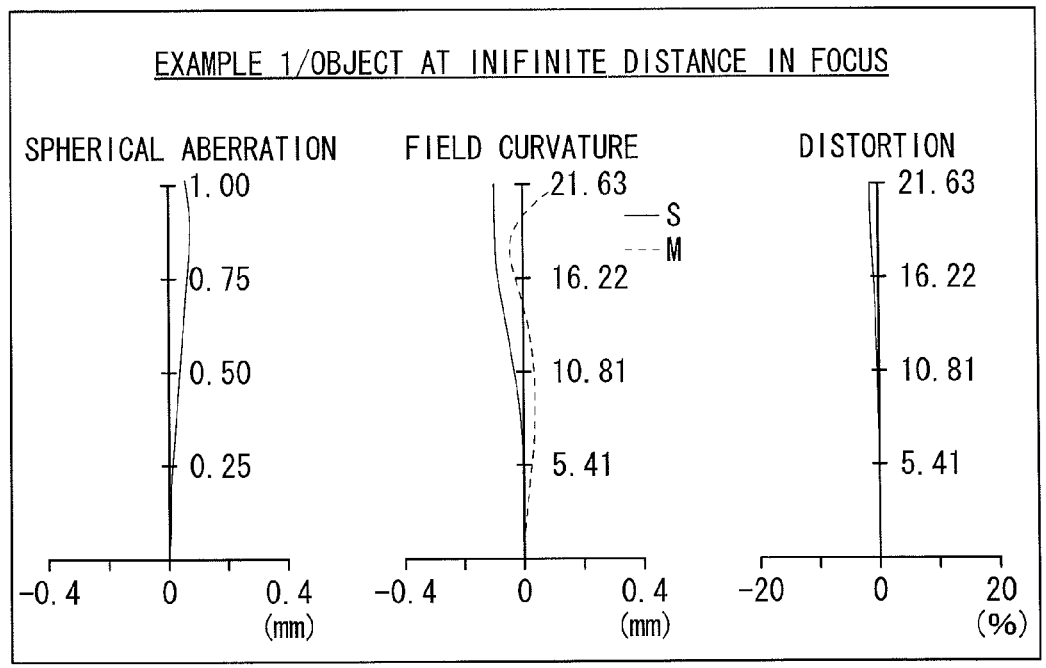
FIG. 2 is an aberration diagram illustrating spherical aberration, field curvature, and distortion of an imaging lens corresponding to Numerical Example 1 in a first focusing mode in a state that an object at an infinite distance is in focus.
Figure 3:
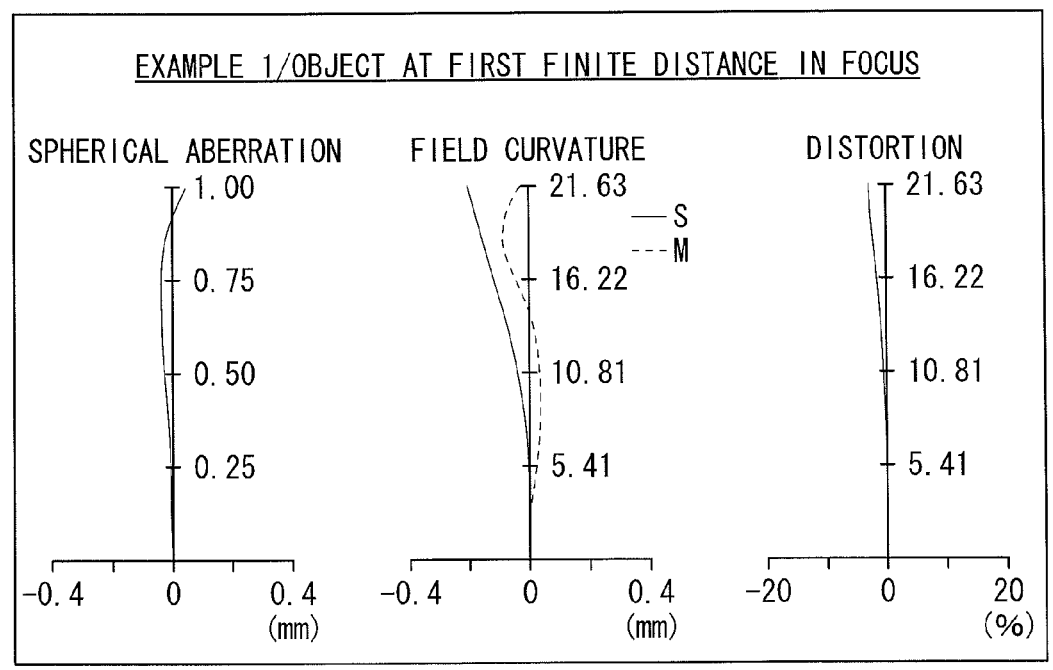
FIG. 3 is an aberration diagram illustrating spherical aberration, field curvature, and distortion of the imaging lens corresponding to Numerical Example 1 in the first focusing mode in a state that an object at a first finite distance is in focus.
Figure 4:
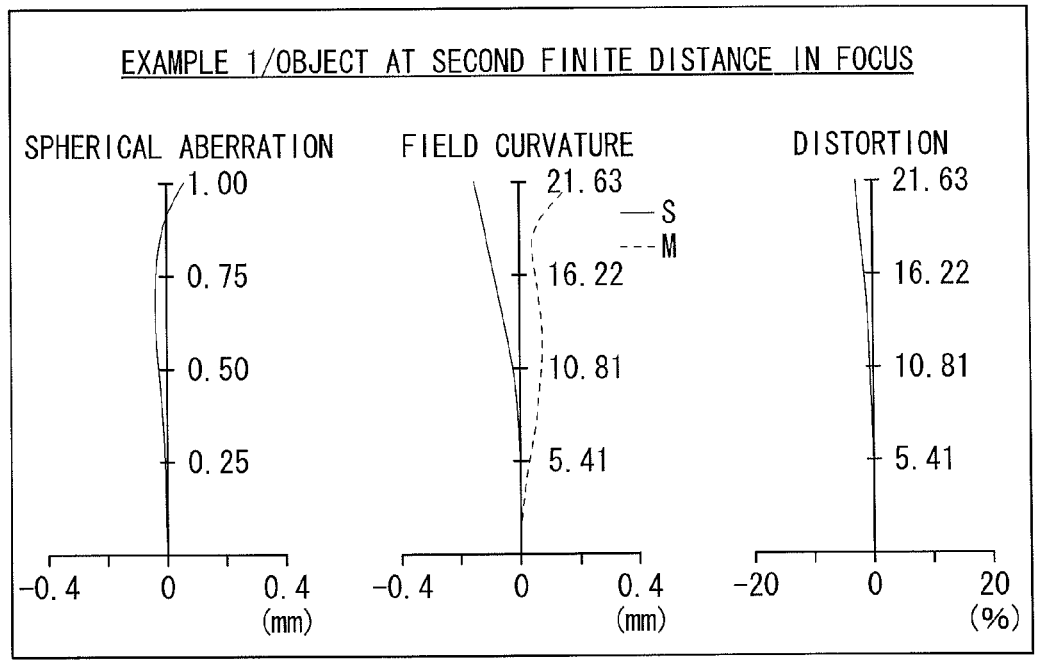
FIG. 4 is an aberration diagram illustrating spherical aberration, field curvature, and distortion of the imaging lens corresponding to Numerical Example 1 in a second focusing mode in a state that an object at a second finite distance is in focus.
Figure 5:
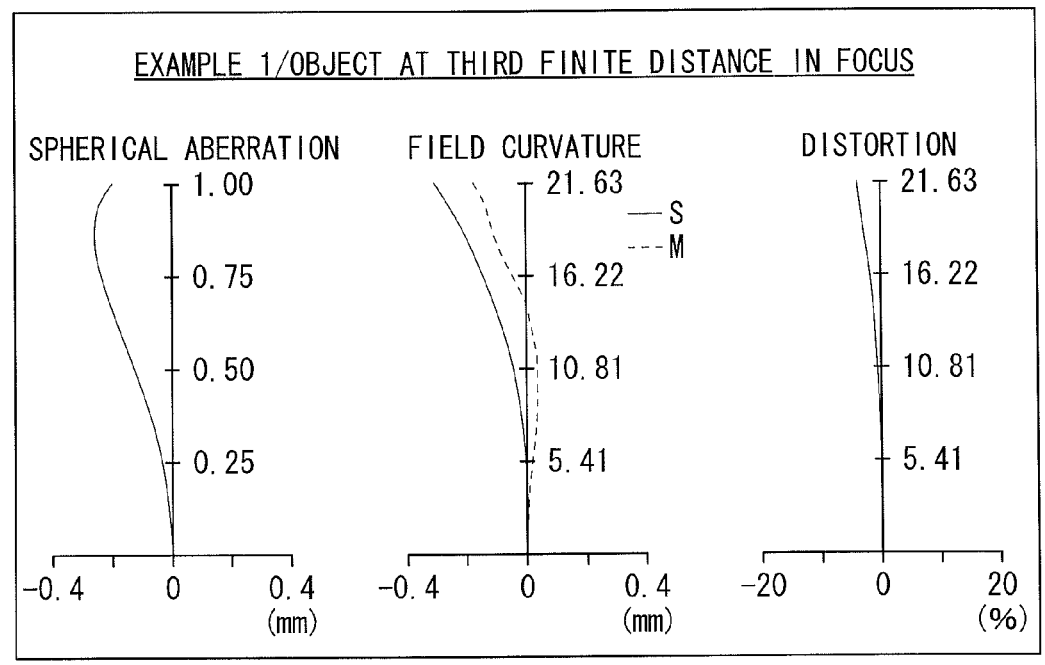
FIG. 5 is an aberration diagram illustrating spherical aberration, field curvature, and distortion of the imaging lens corresponding to Numerical Example 1 in the second focusing mode in a state that an object at a third finite distance is in focus.

Aberration performance of the imaging lens 1 corresponding to the above-described Numerical Example 1 is shown in FIGS. 2 to 5. FIG. 2 shows aberration in the state that an object at the infinite distance is in focus in the first focusing mode M1. FIG. 3 shows aberration in the state that an object at the first finite distance is in focus in the first focusing mode M1. FIG. 4 shows aberration in the state that an object at the second finite distance is in focus in the second focusing mode M2. FIG. 5 shows aberration in the state that the object at the third finite distance is in focus in the second focusing mode M2.

FIGS. 2 to 5 each show spherical aberration, astigmatism (field curvature), and distortion as aberration diagram. In each aberration diagram, aberration is shown with the d line (587.6 nm) as the reference wavelength. In the aberration diagram showing the field curvature, a solid line (S) shows aberration in a sagittal image plane and a dashed line (M) shows aberration in a meridional image plane.

As can be clearly seen from the respective aberration diagrams described above, various kinds of aberration are favorably corrected and superior imaging performance is achieved.

Numerical Example 2

Tables 5 to 8 each show specific numerical examples corresponding to the imaging lens 2 according to the second configuration example shown in FIG. 6. In particular, Table 5 shows basic lens data thereof, and Table 6 shows data on aspherical surfaces. Tables 7 and 8 show other data.

In the imaging lens 2, the first lens group GR1 includes a first lens G1 that is configured of a meniscus-shaped negative lens that has a convex surface facing toward the object plane. The second lens group GR2 includes a second lens G2 and a third lens G3 that are arranged in order from the object plane toward the image plane. The second lens G2 is configured of a negative lens having a biconcave shape. The third lens G3 is configured of a meniscus-shaped positive lens that has a convex surface facing toward the object plane. The third lens group GR3 includes a cemented lens in which a fourth lens G4 and a fifth lens G5 are cemented to each other and a sixth lens G6 that are arranged in order from the object plane toward the image plane. The fourth lens G4 is configured of a negative lens having a biconcave shape. The fifth lens G5 is configured of a positive lens having a biconvex shape. The sixth lens G6 is configured of a positive lens having a biconvex shape. The fourth lens group GR4 includes a seventh lens G7 and an eighth lens G8 that are arranged in order from the object plane toward the image plane. The seventh lens G7 is configured of a meniscus-shaped negative lens that has a concave surface facing toward the object plane. The eighth lens G8 is configured of a positive lens having a plano-convex shape that has a convex surface facing toward the object plane. The filter FL is arranged between the fourth lens group GR4 and the image plane IMG. The aperture stop S is arranged in vicinity of the second lens group GR2 on the image plane side thereof, and travels together with the second lens group GR2 during focusing operation. During focusing operation, the second lens group GR2 and the third lens group GR3 in the movable lens group GR0 serve as the second sub lens group.

In Numerical Example 2, both surfaces (a fifth surface and a sixth surface) of the positive lens (G3) in the second lens group GR2, an image-sided surface (a tenth surface) of the positive lens (G5) in the third lens group GR3, and both surfaces (a thirteenth surface and a fourteenth surface) of the negative lens (G7) in the fourth lens group GR4 are aspherical surfaces. Values of the 4th-order, 6th-order, 8th-order, and 10th-order aspherical surface coefficients A, B, C, and D of the aspherical surfaces in Numerical Example 2 are shown together with values of the conic constant K in Table 6.

Table 7 shows values of a focal length f, F number Fno, and a half angle of view ω in a state that an object at the infinite distance is in focus in the first focusing mode M1, in a state that an object at the first finite distance is in focus in the first focusing mode M1, in a state that an object at the second finite distance is in focus in the second focusing mode M2, and in a state that an object at the third finite distance is in focus in the second focusing mode M2.

In Numerical Example 2, during focusing operation, a surface spacing D2 between the first lens group GR1 and the second lens group GR2, a surface spacing D7 between the second lens group GR2 and the third lens group GR3, and a surface spacing D12 between the third lens group GR3 and the fourth lens group GR4 are varied. Table 8 shows values of magnification and variable spacing in each of the state that an object at the infinite distance is in focus in the first focusing mode M1, the state that an object at the first finite distance is in focus in the first focusing mode M1, the state that an object at the second finite distance is in focus in the second focusing mode M2, and the state that an object at the third finite distance is in focus in the second focusing mode M2.

TABLE 5

Example 2

| lens group | surface number | ri | Di | Ni | vi |
|---|---|---|---|---|---|
| GR1 | 1 | 100.000 | 1.50 | 1.5891 | 61.25 |
| | 2 | 90.072 | (D2) | | |
| GR2 | 3 | −291.844 | 1.00 | 1.8467 | 23.78 |
| | 4 | 63.122 | 0.50 | | |
| | 5 | 19.560 | 3.62 | 1.8820 | 37.22 |
| | 6 | 363.644 | 3.47 | | |
| (aperture stop) | 7 | 0.000 | (D7) | | |
| GR3 | 8 | −17.426 | 1.00 | 1.9229 | 20.88 |
| | 9 | 57.270 | 3.52 | 1.8820 | 37.22 |
| | 10 | −34.769 | 0.52 | | |
| | 11 | 269.211 | 5.00 | 2.0010 | 29.13 |
| | 12 | −28.489 | (D12) | | |
| GR4 | 13 | −15.817 | 1.50 | 1.5831 | 59.46 |
| | 14 | −1000.000 | 0.50 | | |
| | 15 | 87.826 | 3.65 | 1.8810 | 40.14 |
| | 16 | 0.000 | 1.00 | | |
| FL | 17 | 0.000 | 1.85 | 1.5490 | 64.20 |
| | 18 | 0.000 | 0.59 | 1.5190 | 64.20 |
| | 19 | 0.000 | 0.42 | | |
| | 20 | 0.000 | 0.70 | 1.5168 | 64.20 |
| | 21 | 0.000 | 0.92 | | |

TABLE 6

Example 2 • aspherical surface data

| surface number | K | A | B | C | D |
|---|---|---|---|---|---|
| 5 | 3.7456E−01 | −5.3211E−06 | 2.8913E−08 | −1.3407E−10 | 2.2678E−12 |
| 6 | −4.2666E+01 | 1.1939E−05 | 1.4504E−08 | 1.6751E−10 | 1.5544E−13 |
| 10 | −8.0869E+00 | −1.8585E−06 | 1.3312E−07 | −1.3840E−10 | 1.8135E−12 |
| 13 | −1.2493E+00 | 2.3015E−05 | −2.1161E−07 | 5.3458E−10 | −1.4405E−13 |
| 14 | 4.8867E+01 | 1.8762E−05 | −1.1860E−07 | 1.9843E−10 | −8.4325E−14 |

TABLE 7

Example 2

| | first focusing mode | | second focusing mode | |
|---|---|---|---|---|
| | infinite distance | first finite distance | second finite distance | third finite distance |
| f | 35.88 | 31.89 | 32.99 | 29.55 |
| Fno | 2.05 | 2.21 | 2.16 | 2.35 |
| ω | 31.08 | 29.14 | 29.76 | 27.70 |

TABLE 8

Example 2

| | first focusing mode | | second focusing mode | |
|---|---|---|---|---|
| | infinite distance | first finite distance | second finite distance | third finite distance |
| magnification | — | 0.15 | 0.11 | 0.27 |
| D2 | 7.10 | 3.71 | 7.59 | 3.96 |
| D7 | 7.16 | 6.48 | 6.70 | 6.25 |
| D12 | 13.49 | 17.57 | 16.30 | 20.37 |

Figure 7:
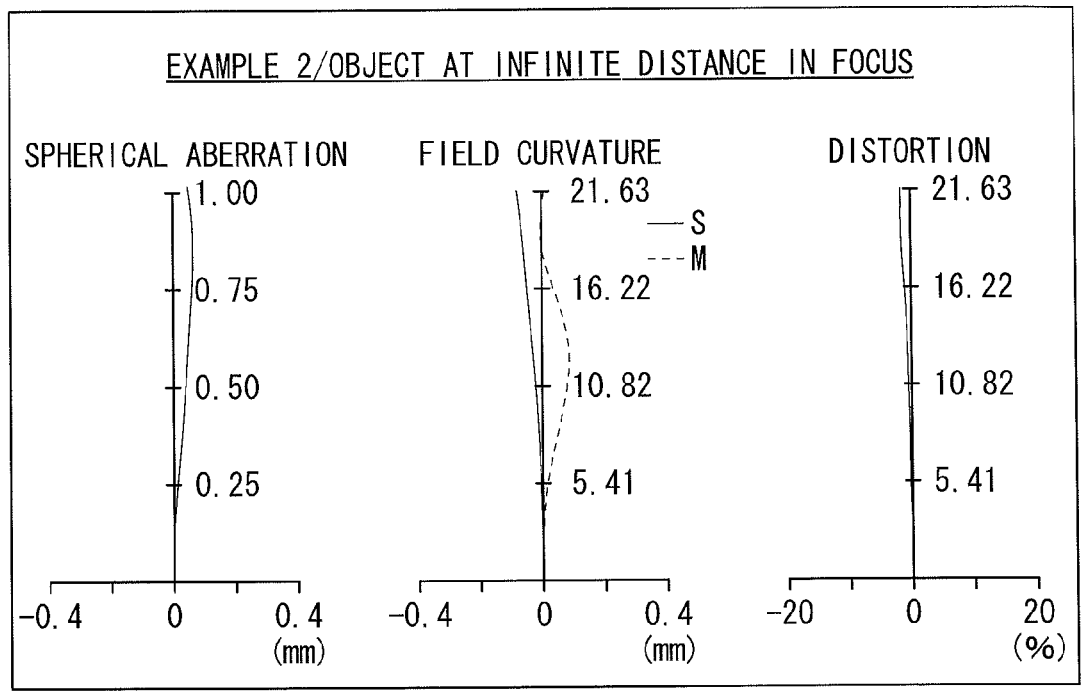
FIG. 7 is an aberration diagram illustrating spherical aberration, field curvature, and distortion of an imaging lens corresponding to Numerical Example 2 in the first focusing mode in a state that an object at the infinite distance is in focus.
Figure 8:
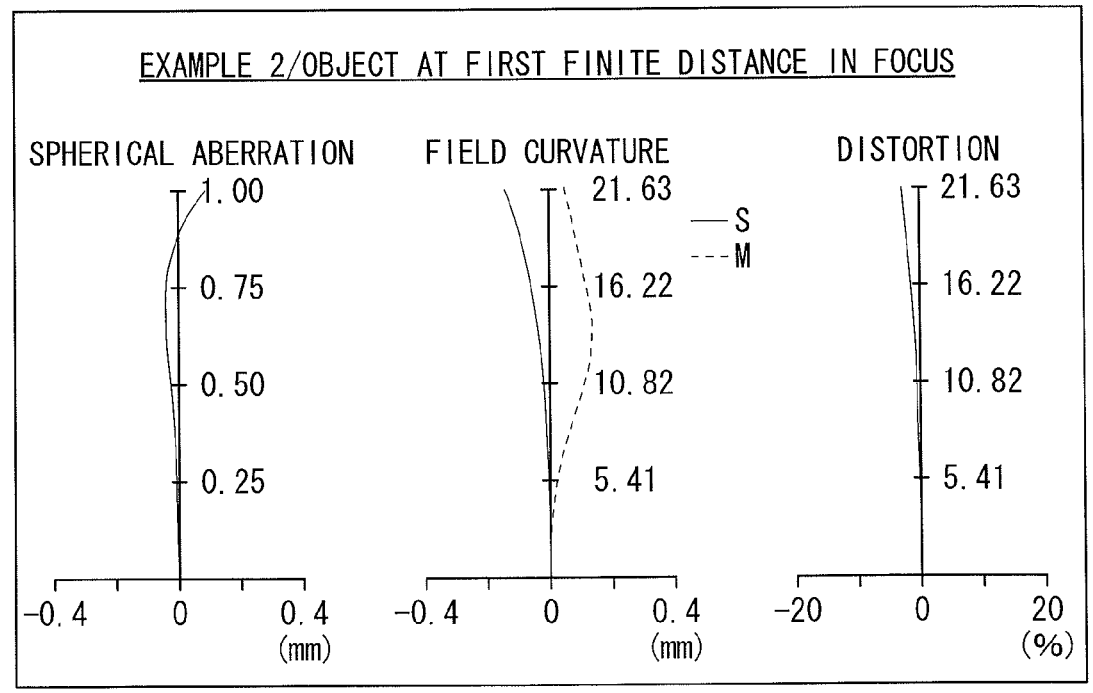
FIG. 8 is an aberration diagram illustrating spherical aberration, field curvature, and distortion of the imaging lens corresponding to Numerical Example 2 in the first focusing mode in a state that an object at the first finite distance is in focus.

Aberration performance of the imaging lens 2 corresponding to the above-described Numerical Example 2 is shown in FIGS. 7 to 10. FIG. 7 shows aberration in the state that an object at the infinite distance is in focus in the first focusing mode M1. FIG. 8 shows aberration in the state that an object at the first finite distance is in focus in the first focusing mode M1.

Figure 9:
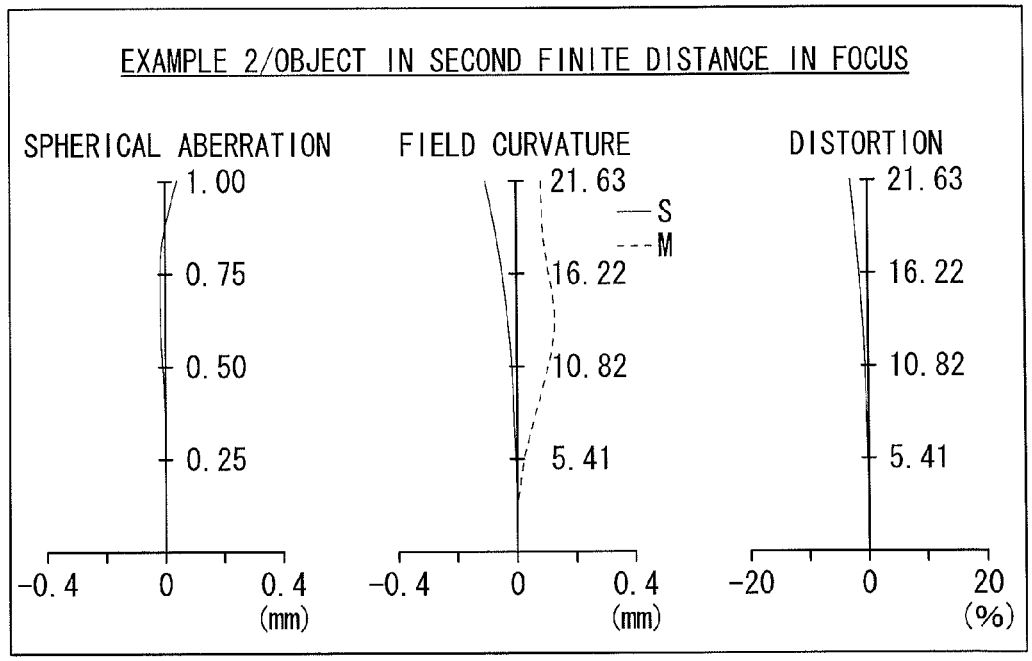
FIG. 9 is an aberration diagram illustrating spherical aberration, field curvature, and distortion of the imaging lens corresponding to Numerical Example 2 in the second focusing mode in a state that an object at the second finite distance is in focus.
Figure 10:
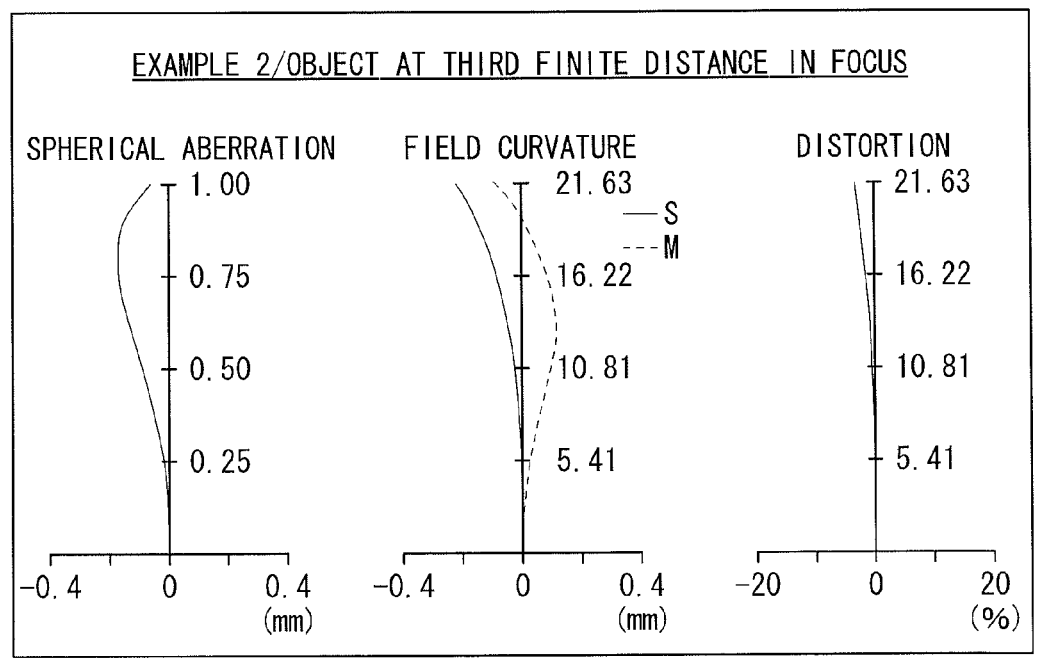
FIG. 10 is an aberration diagram illustrating spherical aberration, field curvature, and distortion of the imaging lens corresponding to Numerical Example 2 in the second focusing mode in a state that an object at the third finite distance is in focus.

FIG. 9 shows aberration in the state that an object at the second finite distance is in focus in the second focusing mode M2. FIG. 10 shows aberration in the state that the object at the third finite distance is in focus in the second focusing mode M2.

FIGS. 7 to 10 each show spherical aberration, astigmatism (field curvature), and distortion as aberration diagram. In each aberration diagram, aberration is shown with the d line (587.6 nm) as the reference wavelength. In the aberration diagram showing the field curvature, a solid line (S) shows aberration in a sagittal image plane and a dashed line (M) shows aberration in a meridional image plane.

As can be clearly seen from the respective aberration diagrams described above, various kinds of aberration are favorably corrected and superior imaging performance is achieved.

Numerical Example 3

Tables 9 to 12 each show specific numerical examples corresponding to the imaging lens 3 according to the third configuration example shown in FIG. 11. In particular, Table 9 shows basic lens data thereof, and Table 10 shows data on aspherical surfaces. Tables 11 and 12 show other data.

In the imaging lens 3, the first lens group GR1 includes a first lens G1 that is configured of a meniscus-shaped negative lens that has a convex surface facing toward the object plane. The second lens group GR2 includes a second lens G2 and a third lens G3 that are arranged in order from the object plane toward the image plane. The second lens G2 is configured of a negative lens having a biconcave shape. The third lens G3 is configured of a meniscus-shaped positive lens that has a convex surface facing toward the object plane. The third lens group GR3 includes a cemented lens in which a fourth lens G4 and a fifth lens G5 are cemented to each other and a sixth lens G6 that are arranged in order from the object plane toward the image plane. The fourth lens G4 is configured of a negative lens having a biconcave shape. The fifth lens G5 is configured of a positive lens having a biconvex shape. The sixth lens G6 is configured of a positive lens having a biconvex shape. The fourth lens group GR4 includes a seventh lens G7 and an eighth lens G8 that are arranged in order from the object plane toward the image plane. The seventh lens G7 is configured of a negative lens having a biconcave shape. The eighth lens G8 is configured of a positive lens having a planoconvex shape that has a convex surface facing toward the object plane. The filter FL is arranged between the fourth lens group GR4 and the image plane IMG. The aperture stop S is arranged in vicinity of the second lens group GR2 on the image plane side thereof, and travels together with the second lens group GR2 during focusing operation. During focusing operation, the second lens group GR2 and the third lens group GR3 in the movable lens group GR0 serve as the second sub lens group.

In Numerical Example 3, both surfaces (a fifth surface and a sixth surface) of the positive lens (G3) in the second lens group GR2, an image-sided surface (a tenth surface) of the positive lens (G5) in the third lens group GR3, and both surfaces (a thirteenth surface and a fourteenth surface) of the negative lens (G7) in the fourth lens group GR4 are aspherical surfaces. Values of the 4th-order, 6th-order, 8th-order, and 10th-order aspherical surface coefficients A, B, C, and D of the aspherical surfaces in Numerical Example 3 are shown together with values of the conic constant K in Table 10.

Table 11 shows values of a focal length f, F number Fno, and a half angle of view ω in a state that an object at the infinite distance is in focus in the first focusing mode M1, in a state that an object at the first finite distance is in focus in the first focusing mode M1, in a state that an object at the second finite distance is in focus in the second focusing mode M2, and in a state that an object at the third finite distance is in focus in the second focusing mode M2.

In Numerical Example 3, during focusing operation, a surface spacing D2 between the first lens group GR1 and the second lens group GR2, a surface spacing D7 between the second lens group GR2 and the third lens group GR3, and a surface spacing D12 between the third lens group GR3 and the fourth lens group GR4 are varied. Table 12 shows values of magnification and variable spacing in each of the state that an object at the infinite distance is in focus in the first focusing mode M1, the state that an object at the first finite distance is in focus in the first focusing mode M1, the state that an object at the second finite distance is in focus in the second focusing mode M2, and the state that an object at the third finite distance is in focus in the second focusing mode M2.

TABLE 9

Example 3

| lens group | surface number | ri | Di | Ni | vi |
|---|---|---|---|---|---|
| GR1 | 1 | 159.600 | 1.50 | 1.5168 | 64.20 |
| | 2 | 77.326 | (D2) | | |
| GR2 | 3 | −69.425 | 1.00 | 1.8052 | 25.46 |
| | 4 | 294.900 | 0.30 | | |
| | 5 | 21.781 | 3.58 | 1.8820 | 37.22 |
| | 6 | −289.804 | 2.50 | | |
| (aperture stop) | 7 | 0.000 | (D7) | | |
| GR3 | 8 | −18.224 | 1.00 | 1.9229 | 20.88 |
| | 9 | 34.516 | 4.05 | 1.8820 | 37.22 |
| | 10 | −46.808 | 0.30 | | |
| | 11 | 192.783 | 5.65 | 2.0010 | 29.13 |
| | 12 | −26.475 | (D12) | | |
| GR4 | 13 | −17.604 | 1.50 | 1.5831 | 59.46 |
| | 14 | 690.328 | 0.30 | | |
| | 15 | 93.242 | 3.48 | 1.9037 | 31.31 |
| | 16 | 0.000 | 1.00 | | |
| FL | 17 | 0.000 | 1.43 | 1.5490 | 64.20 |
| | 18 | 0.000 | 0.59 | 1.5190 | 64.20 |
| | 19 | 0.000 | 0.42 | | |
| | 20 | 0.000 | 0.70 | 1.5168 | 64.20 |
| | 21 | 0.000 | 0.92 | | |

TABLE 10

Example 3 • aspherical surface data

| surface number | K | A | B | C | D |
|---|---|---|---|---|---|
| 5 | 3.1491E−01 | −2.2869E−06 | −2.3122E−09 | 5.0257E−10 | −4.1528E−12 |
| 6 | 0.0000E+00 | 1.1201E−05 | −1.2788E−08 | 4.7065E−10 | −4.6757E−12 |
| 10 | −2.5312E+01 | −5.1489E−06 | 1.8946E−07 | −5.4584E−10 | 1.6124E−12 |
| 13 | −1.1868E+00 | 2.5789E−05 | −2.4014E−07 | 7.2212E−10 | −6.0888E−13 |
| 14 | 0.0000E+00 | 2.0510E−05 | −1.2562E−07 | 2.2322E−10 | −1.1277E−13 |

TABLE 11

| | Example 3 | | | |
|---|---|---|---|---|
| | first focusing mode | | second focusing mode | |
| | infinite distance | first finite distance | second finite distance | third finite distance |
| f | 33.99 | 30.87 | 31.27 | 28.87 |
| Fno | 2.05 | 2.18 | 2.16 | 2.30 |
| ω | 32.48 | 30.62 | 31.13 | 29.32 |

TABLE 12

| | Example 3 | | | |
|---|---|---|---|---|
| | first focusing mode | | second focusing mode | |
| | infinite distance | first finite distance | second finite distance | third finite distance |
| magnification | — | 0.15 | 0.12 | 0.26 |
| D2 | 7.33 | 4.08 | 6.97 | 3.82 |
| D7 | 7.86 | 7.11 | 7.37 | 6.90 |
| D12 | 14.60 | 18.60 | 17.70 | 21.31 |

Figure 12:
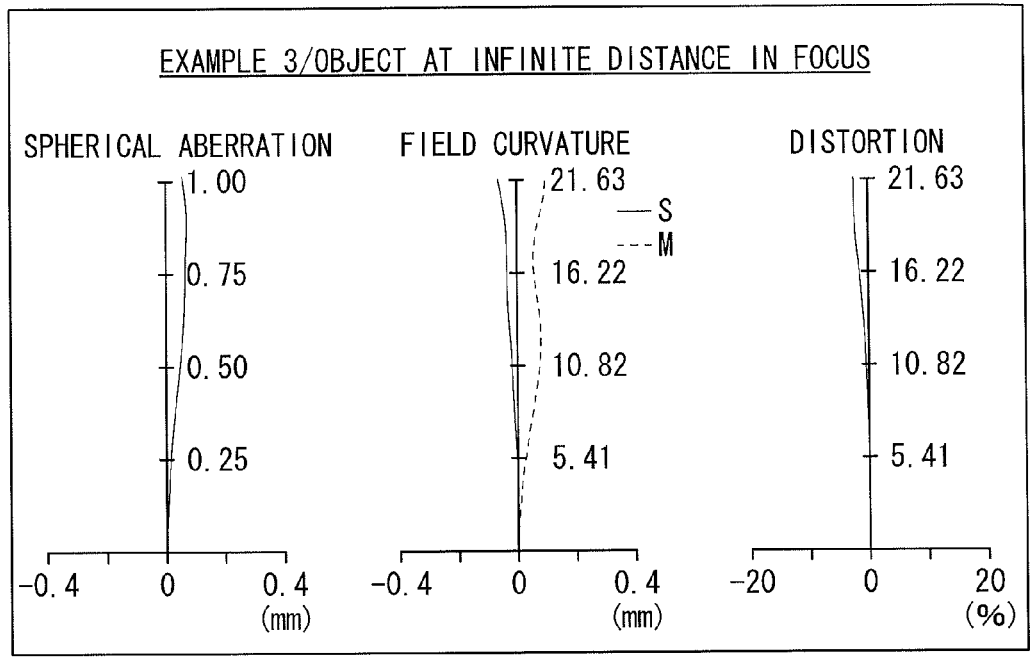
FIG. 12 is an aberration diagram illustrating spherical aberration, field curvature, and distortion of an imaging lens corresponding to Numerical Example 3 in the first focusing mode in a state that an object at the infinite distance is in focus.
Figure 13:
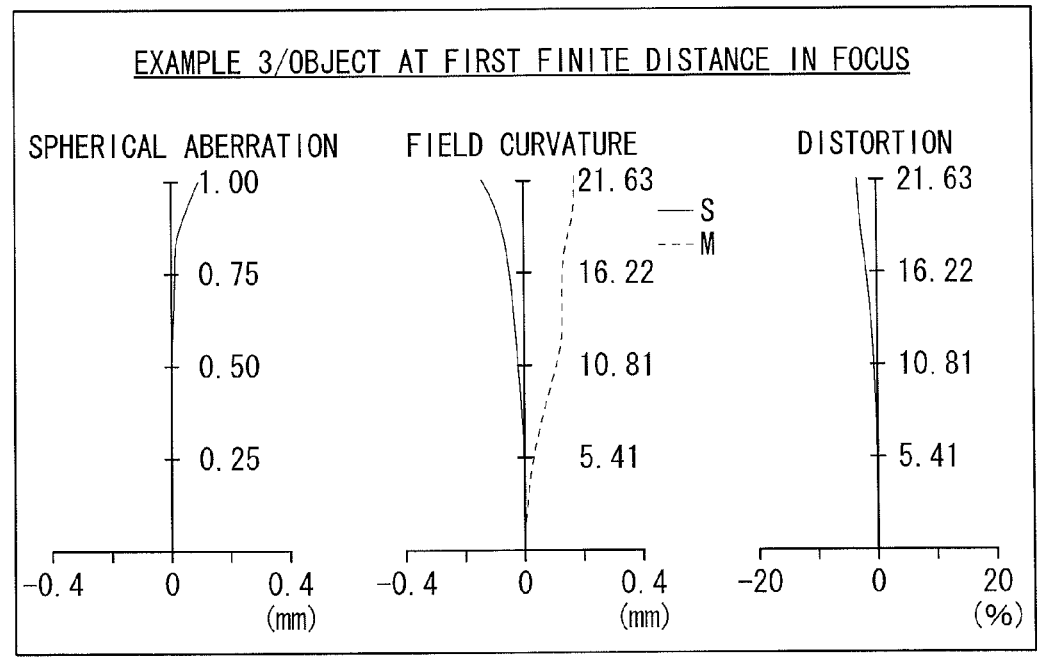
FIG. 13 is an aberration diagram illustrating spherical aberration, field curvature, and distortion of the imaging lens corresponding to Numerical Example 3 in the first focusing mode in a state that an object at the first finite distance is in focus.
Figure 14:
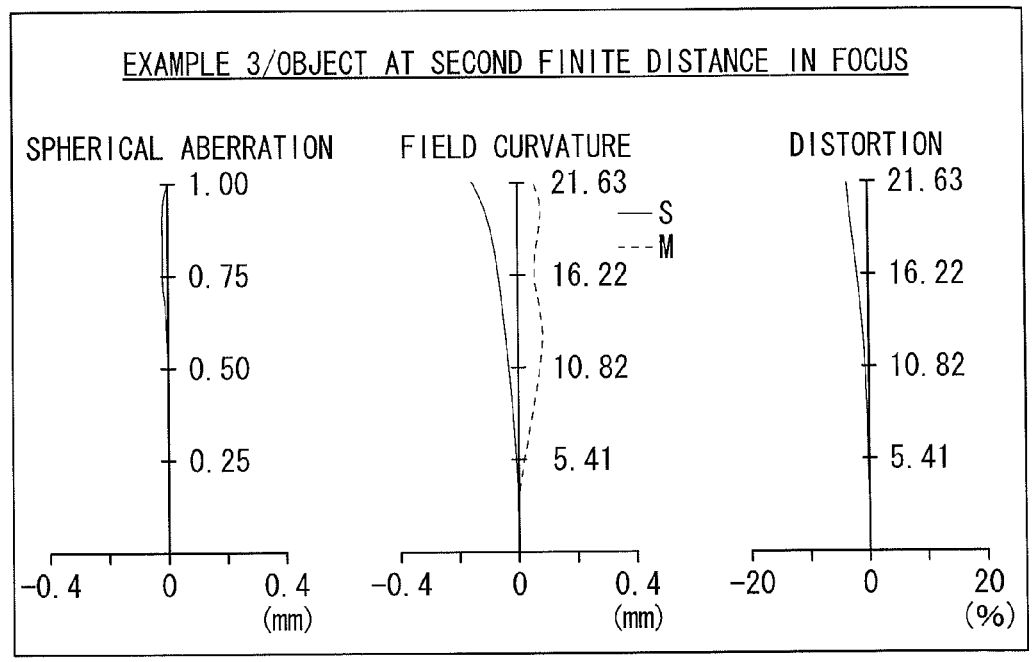
FIG. 14 is an aberration diagram illustrating spherical aberration, field curvature, and distortion of the imaging lens corresponding to Numerical Example 3 in the second focusing mode in a state that an object at the second finite distance is in focus.
Figure 15:
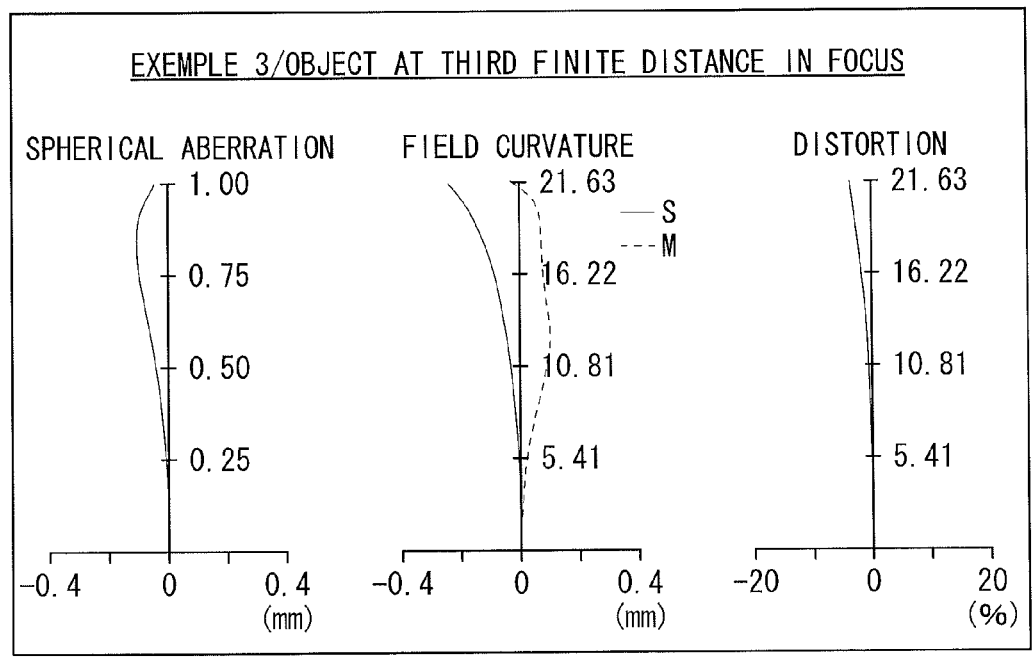
FIG. 15 is an aberration diagram illustrating spherical aberration, field curvature, and distortion of the imaging lens corresponding to Numerical Example 3 in the second focusing mode in a state that an object at the third finite distance is in focus.

Aberration performance of the imaging lens 3 corresponding to the above-described Numerical Example 3 is shown in FIGS. 12 to 15. FIG. 12 shows aberration in the state that an object at the infinite distance is in focus in the first focusing mode M1. FIG. 13 shows aberration in the state that an object at the first finite distance is in focus in the first focusing mode M1. FIG. 14 is aberration in the state that an object at the second finite distance is in focus in the second focusing mode M2. FIG. 15 shows aberration in the state that the object at the third finite distance is in focus in the second focusing mode M2.

FIGS. 12 to 15 each show spherical aberration, astigmatism (field curvature), and distortion as aberration diagram. In each aberration diagram, aberration is shown with the d line (587.6 nm) as the reference wavelength. In the aberration diagram showing the field curvature, a solid line (S) shows aberration in a sagittal image plane and a dashed line (M) shows aberration in a meridional image plane.

As can be clearly seen from the respective aberration diagrams described above, various kinds of aberration are favorably corrected and superior imaging performance is achieved.

[Other Numerical Value Data of Respective Examples]

Table 13 shows values related to the above-described respective conditional expressions that are summarized for each numerical example. As can be seen from Table 13, the value of each numerical example is within a range of the numerical value for each conditional expression.

TABLE 13

| conditional expression | Example 1 | Example 2 | Example 3 |
|---|---|---|---|
| T1 | 35.21 | 34.39 | 35.06 |
| T2 | 34.68 | 34.42 | 34.22 |
| (1)T1/T2 | 1.02 | 1.00 | 1.02 |
| TL | 59.01 | 59.00 | 60.00 |
| Y | 21.63 | 21.63 | 21.63 |
| (2)TL/Y | 2.73 | 2.73 | 2.77 |

5. Other Embodiments

The technology according to the present disclosure is not limited to the description above in the above-described embodiment and the Examples, and may be variously modified. For example, the shape of each section and the numerical values shown in each of the above-described numerical examples are mere examples of a specific embodiment to carry out the present technology, and the technical scope of the present technology should not be construed limitedly based thereon.

Moreover, in the above-described embodiment and Examples, the configuration that is substantially configured of four lens groups including the first lens group GR1 to the fourth lens group GR4 is described. However, a configuration further including a lens that substantially has no refractive power may be adopted.

It is possible to achieve at least the following configurations from the above-described example embodiment of the disclosure.

[1] An imaging lens including:
a movable lens group with total positive refractive power, including a first sub lens group and a second sub lens group; and
an ever-fixed lens group that is ever-fixed,
the imaging lens having a first focusing mode for focusing operation in a first focus range and a second focusing mode for focusing operation in a second focus range, the first focus range covering from an object at an infinite distance to an object at a first finite distance, and the second focus range covering from an object at a second finite distance that is shorter than the infinite distance to an object at a third finite distance that is shorter than the first finite distance,
wherein the first sub lens group is configured to be fixed during each of the first and second focusing modes,
the second sub lens group is configured to travel during each of the first and second focusing modes, and
traveling of the movable lens group as a whole toward object plane allows switching from the first focusing mode to the second focusing mode.

[2] The imaging lens according to [1], wherein the ever-fixed lens group is arranged at a most-image-sided position.

[3] The imaging lens according to [1] or [2], wherein the ever-fixed lens group has negative refractive power.
[4] The imaging lens according to any one of [1] to [3], wherein the second sub lens group includes a plurality of lens groups, and traveling of same one or more lens groups in the plurality of lens groups along an optical axis allows the focusing operation in the first focusing mode and the focusing operation in the second focusing mode.
[5] The imaging lens according to any one of [1] to [4], wherein the second sub lens group includes an aspherical surface.
[6] The imaging lens according to any one of [1] to [5], wherein the second sub lens group includes two lens groups, and
the focusing operations in the first and second focusing modes are each performed through allowing the respective two lens groups to travel independently toward the object plane.
[7] The imaging lens according to any one of [1] to [6], wherein a traveling path of the second sub lens group during the focusing operation in the first focusing mode is different from a traveling path of the second sub lens group during the focusing operation in the second focusing mode.
[8] The imaging lens according to [7], wherein
the second sub lens group includes two lens groups, and
a traveling difference between one of the two lens groups and the other thereof during the focusing operation in the first focusing mode is different from a traveling difference between the one and the other during the focusing operation in the second focusing mode.
[9] The imaging lens according to any one of [1] to [8], wherein following conditional expression is satisfied, $$0.6 < T1/T2 < 1.5 \quad (1)$$

where T1 is a length of the movable lens group along an optical axis in a condition that the imaging lens is in focus on the object at the infinite distance in the first focusing mode, and
T2 is the length of the movable lens group along the optical axis in a condition that the imaging lens is in focus on the object at the second finite distance in the second focusing mode.
[10] The imaging lens according to any one of [1] to [9], wherein following conditional expression is satisfied, $$2.0 < TL/Y < 3.5 \quad (2)$$

where TL is a total length of the imaging lens along an optical axis in a condition that the imaging lens is in focus on the object at the infinite distance, and
Y is a maximum image height along image plane.
[11] The imaging lens according to any one of [1] to [10], further including a lens substantially having no refractive power.
[12] An image pickup apparatus with an imaging lens and an image pickup device outputting an image pickup signal based on an optical image formed by the imaging lens, the imaging lens including:
a movable lens group with total positive refractive power, including a first sub lens group and a second sub lens group; and
an ever-fixed lens group that is ever-fixed,
the imaging lens having a first focusing mode for focusing operation in a first focus range and a second focusing mode for focusing operation in a second focus range, the first focus range covering from an object at an infinite distance to an object at a first finite distance, and the second focus range covering from an object at a second finite distance that is shorter than the infinite distance to an object at a third finite distance that is shorter than the first finite distance,
wherein the first sub lens group is configured to be fixed during each of the first and second focusing modes,
the second sub lens group is configured to travel during each of the first and second focusing modes, and
traveling of the movable lens group as a whole toward object plane allows switching from the first focusing mode to the second focusing mode.
[13] The imaging pickup apparatus according to [12], further including a lens substantially having no refractive power.

The present application contains subject matter related to that disclosed in Japanese Priority Patent Application JP 2012-199074 filed in the Japan Patent Office on Sep. 11, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. An imaging lens comprising:
a movable lens group with total positive refractive power, including a first sub lens group and a second sub lens group,
wherein the second sub lens group includes two lens groups having positive refractive power, and
focusing operations in a first focusing mode and a second focusing mode are each performed through allowing the respective two lens groups of the second sub lens group to travel independently toward an object plane; and
an ever-fixed lens group that is ever-fixed,
the imaging lens having the first focusing mode for the focusing operation in a first focus range and the second focusing mode for the focusing operation in a second focus range, the first focus range covering from an object at an infinite distance to an object at a first finite distance, and the second focus range covering from an object at a second finite distance that is shorter than the infinite distance to an object at a third finite distance that is shorter than the first finite distance,
wherein the first sub lens group is configured to be fixed during each of the first and second focusing modes, and
traveling of the movable lens group as a whole toward the object plane allows switching from the first focusing mode to the second focusing mode.
2. The imaging lens according to claim 1, wherein the ever-fixed lens group is arranged at a most-image-sided position.
3. The imaging lens according to claim 2, wherein the ever-fixed lens group has negative refractive power.
4. The imaging lens according to claim 1, wherein following conditional expression is satisfied,

$$2.0 < TL/Y < 3.5 \quad (2)$$

where TL is a total length of the imaging lens along an optical axis in a condition that the imaging lens is in focus on the object at the infinite distance, and
Y is a maximum image height along image plane.
5. The imaging lens according to claim 1, wherein
the second sub lens group includes a plurality of lens groups, and
traveling of same one or more lens groups in the plurality of lens groups along an optical axis allows the focusing operation in the first focusing mode and the focusing operation in the second focusing mode.

6. The imaging lens according to claim 1, wherein the second sub lens group includes an aspherical surface.

7. The imaging lens according to claim 1, wherein a traveling path of the second sub lens group during the focusing operation in the first focusing mode is different from a traveling path of the second sub lens group during the focusing operation in the second focusing mode.

8. The imaging lens according to claim 1, wherein
a traveling difference between one of the two lens groups of the second sub lens group and the other lens group of the second sub lens group during the focusing operation in the first focusing mode is different from a traveling difference between the one and the other during the focusing operation in the second focusing mode.

9. The imaging lens according to claim 1, wherein following conditional expression is satisfied, $$0.6 < T1/T2 < 1.5 \qquad (1)$$

where T1 is a length of the movable lens group along an optical axis in a condition that the imaging lens is in focus on the object at the infinite distance in the first focusing mode, and
T2 is the length of the movable lens group along the optical axis in a condition that the imaging lens is in focus on the object at the second finite distance in the second focusing mode.

10. An image pickup apparatus with an imaging lens and an image pickup device outputting an image pickup signal based on an optical image formed by the imaging lens, the imaging lens comprising:
a movable lens group with total positive refractive power, including a first sub lens group and a second sub lens group,
  wherein the second sub lens group includes two lens groups having positive refractive power, and
  focusing operations in a first focusing mode and a second focusing mode are each performed through allowing the respective two lens groups of the second sub lends group to travel independently toward an object plane; and
an ever-fixed lens group that is ever-fixed,
the imaging lens having the first focusing mode for the focusing operation in a first focus range and the second focusing mode for the focusing operation in a second focus range, the first focus range covering from an object at an infinite distance to an object at a first finite distance, and the second focus range covering from an object at a second finite distance that is shorter than the infinite distance to an object at a third finite distance that is shorter than the first finite distance,
wherein the first sub lens group is configured to be fixed during each of the first and second focusing modes,
traveling of the movable lens group as a whole toward the object plane allows switching from the first focusing mode to the second focusing mode.

11. An imaging lens comprising:
a movable lens group with total positive refractive power, including a first sub lens group and a second sub lens group; and
an ever-fixed lens group that is ever-fixed,
the imaging lens having a first focusing mode for focusing operation in a first focus range and a second focusing mode for focusing operation in a second focus range, the first focus range covering from an object at an infinite distance to an object at a first finite distance, and the second focus range covering from an object at a second finite distance that is shorter than the infinite distance to an object at a third finite distance that is shorter than the first finite distance,
wherein the first sub lens group is configured to be fixed during each of the first and second focusing modes,
the second sub lens group is configured to travel during each of the first and second focusing modes,
traveling of the movable lens group as a whole toward object plane allows switching from the first focusing mode to the second focusing mode, and
wherein the following conditional expression is satisfied, $$2.0 < TL/Y < 3.5$$

where TL is a total length of the imaging lens along an optical axis in a condition that the imaging lens is in focus on the object at the infinite distance, and
Y is a maximum image height along image plane.

* * * * *